United States Patent [19]

Fell et al.

[11] 4,221,296

[45] Sep. 9, 1980

[54] SHIPPING ASSEMBLY

[75] Inventors: Don R. Fell, Stoney Creek; Seiji Takeuchi, Burlington, both of Canada

[73] Assignees: Don Fell Limited; Gordon Fell Limited; Lawrence Fell Limited, all of Hamilton, Canada

[21] Appl. No.: 42,891

[22] Filed: May 29, 1979

[30] Foreign Application Priority Data

Mar. 20, 1979 [CA] Canada ................................. 323855

[51] Int. Cl.³ ...................... B65D 19/16; B65D 5/74; B65D 90/04
[52] U.S. Cl. ...................................... 206/600; 220/6; 217/43 A
[58] Field of Search .................... 206/386, 600; 220/6; 217/43 A

[56] References Cited

U.S. PATENT DOCUMENTS

| | | | |
|---|---|---|---|
| 2,534,010 | 12/1950 | Frye | 206/600 |
| 3,291,364 | 12/1966 | Fischer | 206/600 |
| 3,323,674 | 6/1967 | Nist, Jr. | 217/43 A |
| 3,327,889 | 6/1967 | Dore | 220/6 |
| 3,344,831 | 10/1967 | Brackett | 220/6 |
| 3,348,723 | 10/1967 | Wilson | 220/6 |

Primary Examiner—William T. Dixson, Jr.

[57] ABSTRACT

A shipping assembly for dry bulk commodities consists of a polyolefin bag confined within a rectangular, rigid, metal frame. A wooden pallet forms a support for the frame and the bottom of the bag. The assembly can be assembled for use or disassembled for shipment, the frame being foldable and connectable to the pallet by means of hooks that can be readily moved into place but cannot be disengaged by attempted relative movement between the frame and pallet. The assembly and disassembly operations require no tools.

5 Claims, 3 Drawing Figures

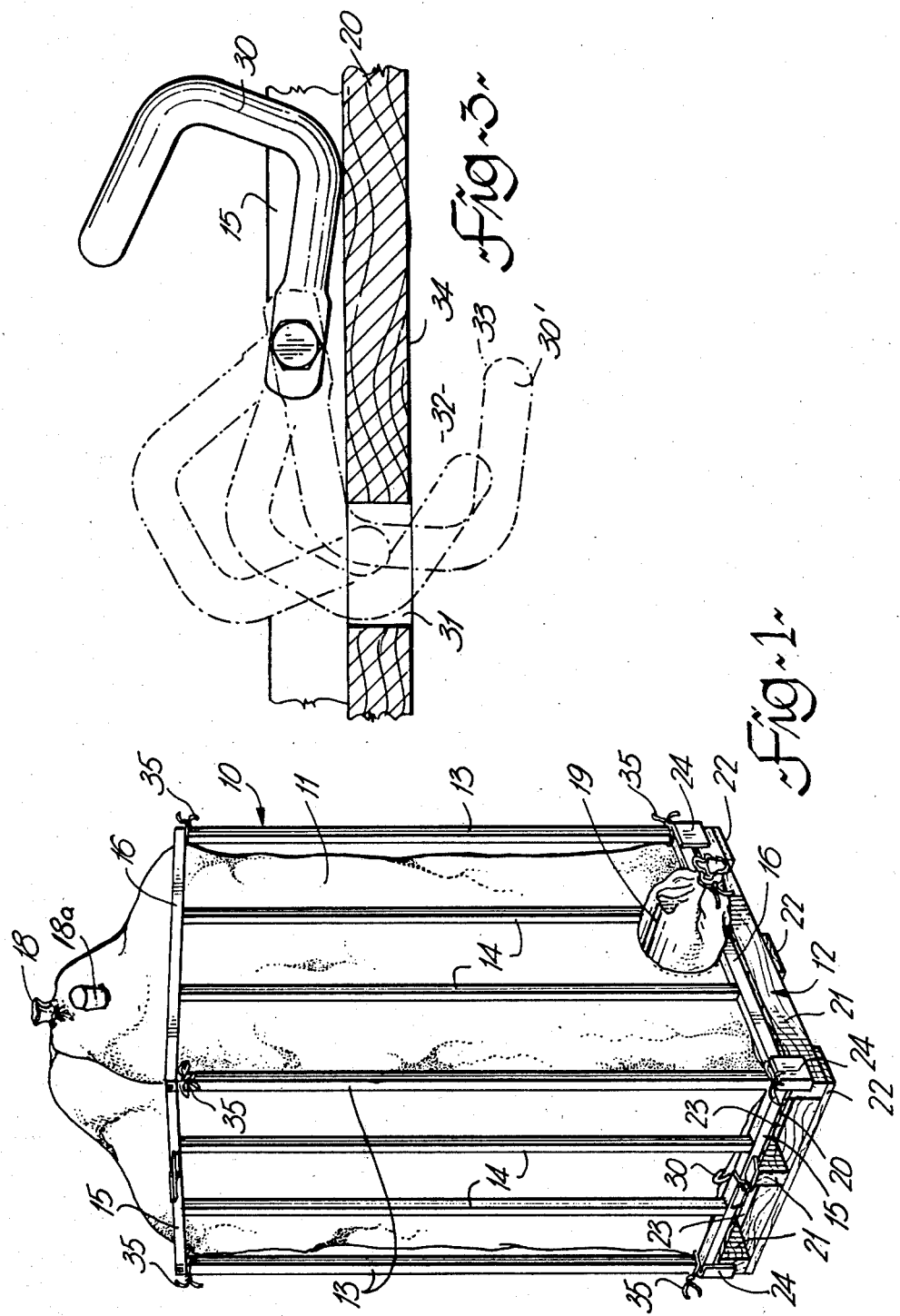

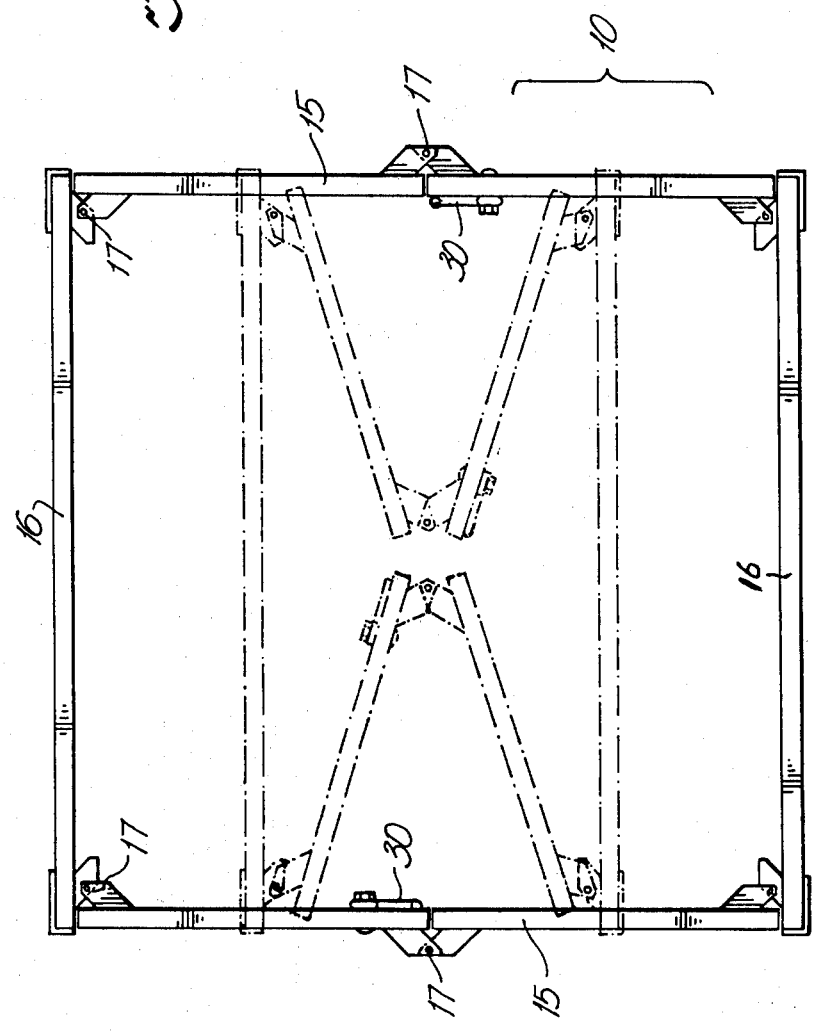

SHIPPING ASSEMBLY

BACKGROUND OF THE INVENTION

This invention relates to a so-called shipping assembly for transporting free-flowing dry bulk commodities, such as chemicals, fertilizers, minerals, cement, seed, grains, pharmaceuticals, dyes, pigments, resins, plastics, detergents and the like. The assembly is usable not only for shipping such products in bulk, but also for the storage and general handling of them in and around industrial plants.

An object of the invention is to provide an assembly that is easy to handle, i.e. to erect or disassemble, and is also compact, stackable, comparatively light weight, collapsible and hence returnable. Assembly and disassembly can be carried out without any tools and the erected assembly can be readily handled by a light machine such as a conventional fork lift truck. Yet the assembly can serve to store or transport up to 5600 pounds of a bulk commodity.

SUMMARY OF THE INVENTION

Essentially, the assembly consists of a rigid frame that serves to support a flexible bag of suitable material, such as polyolefin, in which the commodity is stored. A third element, in the form of a pallet, is adapted to provide a mounting for the frame. When erected and in use, the pallet forms part of the assembly, but is separable from the frame to enable the three elements (pallet, frame and bag) to be placed in knock down condition for shipment.

While the pallet and frame thus need to be separable from each other, it is also important that, when in use, they act as a unitary assembly. An important feature of the invention is a detent member, e.g. a hook device, that interconnects the frame and pallet in an extremely simple but nonetheless effective manner.

To this end the invention consists of a shipping assembly for a dry bulk commodity comprising (a) a flexible bag having openings for receiving and discharging such commodity; (b) a foldable, rigid frame having a periphery for containing and supporting said bag; (c) a pallet for supporting said frame and the bottom of the bag; and (d) releasable means for interconnecting said pallet and frame, said means including at least one downward projection on said frame for engaging the pallet to prevent horizontal relative movement therebetween and at least one detent member mounted on the frame to move between an inoperative position and an engaged position in which it limits vertical relative movement between the frame and the pallet, said detent member being mounted on a portion of the frame inward of the periphery thereof whereby said bag when charged with said commodity overlies said detent member to provide movement thereof from its engaged to its inoperative position.

DESCRIPTION OF THE DRAWINGS

A preferred embodiment of the invention is illustrated by way of example, in the accompanying drawings, in which:

FIG. 1 is a perspective overall view of a shipping assembly;

FIG. 2 is a plan view of the frame of the assembly; and

FIG. 3 is an enlarged, fragmentary view of a hook device forming part of the assembly.

DESCRIPTION OF THE PREFERRED EMBODIMENT

The assembly consists essentially of a rectangular metal frame 10 and a flexible bag 11, the frame being adapted to be mounted on a wooden pallet 12.

The frame 10 consists of vertical corner posts 13 and intermediate vertical members 14 interconnected by top and bottom horizontal members 15 and 16, the members 15 each being formed in two parts joined together by a hinge 17 and similarly connected to the members 16 by hinges 17. FIG. 2 demonstrates in broken lines the manner in which this arrangement permits the frame 10 to be folded flat for storage or shipment when the device is disassembled. For example, typical erected dimensions for the frame are 42"×44"×72×, with knock down dimensions of 42"×8"×72". A hook (not shown) can be mounted by means of a strap on one of the vertical members 14 extending between the horizontal members 16 to engage the opposite vertical member when the frame is fully folded, i.e. beyond the broken line position of FIG. 2, whereby to hold the frame in its fully folded condition.

The bag 11 is formed of clear woven polyolefin to basically the same dimensions as the frame, giving it a capacity of approximately 70 cubic feet. This material is tough and durable and can carry a load up to 5600 pounds when mounted in and supported by the frame 10. The bag has at the top a loading tube 18 and a ventilator tube 18a (which may include a screen), and at the bottom one or more discharge tubes 19. If desired, these discharge tubes can each be fitted with a pair of ties as illustrated in FIG. 7 of the U.S. patent application of Graham Love Ser. No. 06/066671 filed Aug. 15, 1979. Ties 35 on the bag corners serve to secure the bag to the frame. Similar ties (not shown) can be fixed to the vertical centre of the bag at its corners for securing the bag to the frame members 13.

The pallet 12 is of conventional design, consisting of a platform 20 supported by vertically disposed slats 21 which in turn rest on transversely arranged bottom slats 22, thus providing spaces 23 for entry of the forks of a fork lift truck. The platform 20 supports the bottom of the bag 11.

Below the ends of the lower horizontal members 15 and 16 at the corners of the frame there are angled downward projections 24 that embrace the corners of the pallet 12, thus preventing relative horizontal motion in either direction between the frame and the pallet.

To fix the frame to the pallet to prevent relative vertical movement between them, as would tend to take place if the assembly were tipped, detent members in the form of hooks 30 are used. Each hook 30 is freely pivotally mounted on the inside of a lower member 15 so as to be movable between a raised, inoperative position (solid lines in FIG. 3), through the broken line positions indicated, to a final, engaged position indicated at 30'. During this movement the hook passes through a hole 31 in the platform 20 of the pallet 12. It will be observed that the shape of the hook combined with the location of its pivotal axis relative to the hole 31 enables the hook to pass through this comparatively small hole. On the other hand, if an attempt were made to raise the frame 10 vertically from the pallet 12 while the hooks were in their operative positions 30', only slight movement would be possible, as permitted by the clearance 32. Further movement would be prevented by engagement of the end 33 of each hook against the underside of the pallet surface 34. The clearance 32 is made smaller than the length of the downward projections 24, so that these will still grasp the corners of the pallet to preclude sliding movement between it and the frame. It will be observed that the limited possible upward movement of the frame relative to the pallet will not serve to return the hook 30 to its inoperative position. On the contrary, such movement tends to lock the hook in its engaged position by setting up a relationship between the hole 31 and the pivotal axis that jams any tendency for the hook to move or be forced back up through this hole. The arrangement is thus a very simple locking device that can be readily moved when desired, but does not permit unlocking by relative movement of the parts themselves.

The assembly disclosed has a number of advantages over the conventional methods of transporting bulk commodities in bags. Bags are normally designed to be lifted from the top, which requires a fork lift type of machine with high forks. The type using low forks is cheaper and more readily available, and can be used to lift the present assembly by virtue of the use of a pallet.

The present assembly combines foldability for shipment with a strong construction when erect. Supporting the bottom of the bag on the platform of the pallet and the sides of the bag by means of the rigid frame minimises the load on the material of the bag when full and hence prolongs its life and especially the life of its seams. The arrangement is also safer than the type of bag that is lifted from above, in the event of a break. Should there be a burst in the bag, the material will spill out gently compared to the violent discharge from an elevated, unconfined bag that is ruptured.

The use of the frame and the pallet controls the shape of the bag, i.e. preventing slumping, which facilitates side-by-side storage and stacking of a number of such assemblies. They also enable a somewhat bigger bag to be safely used, by comparison with one that is unsupported by a frame.

Locating each hook 30 on the inside of a member 15, i.e. within the periphery of the frame 10, is a safety consideration, because it causes the bag 11, when charged with a commodity, i.e. when fully expanded, to overlie the hook and, by virtue of its weight, to prevent upward movement of the hook, e.g. to prevent accidental disengagement of the hook from the platform 20 of the pallet 12.

We claim:
1. A shipping assembly for a dry bulk commodity comprising
   (a) a flexible bag having openings for receiving and discharging such commodity;
   (b) a foldable, rigid frame having a periphery for containing and supporting said bag;
   (c) a pallet for supporting said frame and the bottom of the bag; and
   (d) releasable means for interconnecting said pallet and frame, said means including at least one downward projection on said frame for engaging the pallet to prevent horizontal relative movement therebetween and at least one detent member mounted on the frame to move between an inoperative position and an engaged position in which it limits vertical relative movement between the frame and the pallet, said detent member being mounted on a portion of the frame inward of the periphery thereof whereby said bag when charged with said commodity overlies said detent member to prevent movement thereof from its engaged to its inoperative position.

2. An assembly according to claim 1, wherein said detent member is a hook freely pivotally mounted on an inwardly facing surface of a lower member of the frame, the pallet being formed with a hole so located that the hook passes therethrough in moving from said inoperative to said engaged position, the hole being smaller than the free end of the hook when in the engaged position whereby vertical movement between the frame and the pallet will hold the hook in place and prevent disengagement thereof.

3. An assembly according to claim 1 or 2, wherein the frame and pallet are rectangular and said downward projections on the frame engage over corners of the pallet.

4. An assembly according to claim 1 or 2, wherein the frame is rectangular and is formed of interconnected vertical and horizontal metal members, the horizontal members on a pair of opposite sides being formed in two parts articulated to each other and to the other horizontal members whereby to render the frame foldable.

5. An assembly according to claim 1, wherein the frame is rectangular and is formed of interconnected vertical and horizontal members, and wherein said detent member is mounted on an inwardly facing surface of a lower horizontal member of the frame.

* * * * *